VARIABLE GAP FILING SYSTEM

Filed March 25, 1964 8 Sheets-Sheet 1

INVENTORS
ANTHONY J. CAPOZZI
ROBERT A. JONES
BY Ronald J. Clark
ATTORNEY

Jan. 17, 1967 A. J. CAPOZZI ET AL 3,299,411

VARIABLE GAP FILING SYSTEM

Filed March 25, 1964 8 Sheets-Sheet 5

Jan. 17, 1967 A. J. CAPOZZI ET AL 3,299,411

VARIABLE GAP FILING SYSTEM

Filed March 25, 1964 8 Sheets-Sheet 7

United States Patent Office 3,299,411
Patented Jan. 17, 1967

3,299,411
VARIABLE GAP FILING SYSTEM
Anthony J. Capozzi, Binghamton, and Robert A. Jones, Johnson City, N.Y., assignors to International Business Machines Corporation, New York, N.Y., a corporation of New York
Filed Mar. 25, 1964, Ser. No. 354,741
6 Claims. (Cl. 340—172.5)

This invention relates to a variable gap filing system and more particularly, to a variable counting circuit employed in a data filing system for entering variable gaps between successive records stored within the filing system.

Generally, a central processing system includes a permanent filing device for storing the great quantity of reference material required by the system in performing its function. A typical storage device comprising a plurality of magnetic discs and their accessing mechanism. The recording surface of a magnetic disc contains a plurality of concentric tracks physically separate from each other. Moreover, each track is normally subdivided into a plurality of fixed length sections and each section is used to store a separate message. Additionally, each section is individually addressable and accessible by magnetic read-write heads normally employed to enter data onto the discs and detect data written on the discs. Under existing procedures when information is to be stored for later use, a single track location is addressed and one of the fixed length sections is selected. Mechanical movements and operations are employed to select the addressed track and electrical comparisons locate the desired section. A short message leaves a portion of the selective section unused, or a message slightly longer than the fixed length section necessitates the use of two sections and the loss of the storage capacity of the unused portion of the second section.

J. R. Evans in his U.S. patent application entitled "Data Filing System," Serial No. 354,740, filed concurrently herewith and assigned to the assignee of the present invention, discloses a means for maximizing the storage capabilities of magnetic discs, closed loop magnetic strips, or magnetic drums. His device contemplates the abolition of the fixed length sections of a data track. Records are no longer arbitrarily filed into a particular section, but rather are recorded in continuous fashion one after the other. In this manner, maximum use of the storage capacity of a magnetic surface is achieved.

The instant invention is directed to a variable counting circuit which further increases the storage capacity of the discs, magnetic strips, or magnetic drums in the storage device. In writing a plurality of variable length records in succession on the same track of a magnetic disc, it is necessary to leave portions of the magnetic surface or gaps between records upon which no data is written. These gaps are required to allow certain dynamic elements of the storage system to recover their equilibrium condition. For example, a read-write head must equalize after a writing operation before it can be employed in a reading operation. Also, amplifiers throughout the system must readjust from the writing operation to a reading operation. Additionally, the length of the gap is dependent upon the speed of the medium passing beneath the read-write head, and the frequency variation of the recorded data.

Generally, a variable gap is useful between the various major portions of a record if these portions differ greatly in length from one record to the next. However, when the length of these portions is predictable between limits, a fixed gap is used instead. Obviously, the instant invention could be favorably employed to control the gap lengths between these major portions. Merely because the description of the instant invention is directed at inserting variable gaps between records, the scope of the invention is not to be limited to this one instance.

It has been determined that the length of the gap between data areas is a function of the length of the previously written or read record. Therefore, since the recording medium is passing beneath the read-write heads at a constant speed, and the record is being written or read at a constant frequency, the gap between successive records is a function of the number of bytes of information in the record.

Accordingly it is an object of the instant invention to provide an improved filing system having an increased storage capacity.

It is an object of the instant invention to provide a variable gap setting circuit for separating adjacent records on the same track of a magnetic surface.

It is a further object of the instant invention to provide a variable gap setting circuit which controls the separating of successive records depending upon the length of the preceding record.

It is a still further object of the instant invention to provide a variable gap setting circuit which includes means for obtaining a substantially fixed percentage of a binary number.

It is another object of the instant invention to provide a variable gap filing system wherein the gap associated with a record or a data area is a substantially fixed percentage of the number of bytes contained in that record or data area.

According to these objects, the system embodying the invention comprises means for conveying data from the core memory of a computer to magnetic discs or closed loop magnetic strips. Major timing and circuit control are under the direction of a pair of cycle control rings. Each complete cycle of one ring advances the remaining ring one position. Each position or stage of both rings is connected to a series of logic circuits which mainly control the flow of data within the remaining portion of the system. In addition to the cycle control rings, other major elements contribute to achieve the complete timing and circuit control functions. A decrementing counter is employed to indicate the duration of all subdivisions of the record format. For the fixed length portions of the recording format, the counter is set to hold numbers under the control of the cycle control rings. During the variable length portions of the recording format, the counter is set to hold numbers according to information contained in the count field of the record. This information is sampled and stored in registers as it is being transferred from core storage to the file. During its storage it is used to set a plurality of numbers into the counter. These numbers taken in the aggregate represent a certain percentage of the length of the stored record, thereby determining the exact gap length required between records.

The foregoing and other objects, features and advantages of the invention will be apparent from the following more particular description of a preferred embodiment of the invention, as illustrated in the accompanying drawings; wherein FIGS. 1*a* and 1*b* show block diagram of the portion of the instant invention which controls the writing of variable length records into a storage file;

FIG. 2*a* shows a schematic view of a plurality of records which form the input to the system shown in FIGS. 1*a* and 1*b*;

FIG. 2*b* shows a schematic view of the format into which each of the records shown in FIG. 2*a* has been changed by the instant invention;

FIG. 2*c* shows a schematic view of an enlarged count field of a record;

FIGS. 3*a* and 3*b* show a plurality of timing waveforms associated with the circuit shown in FIGS. 1*a* and 1*b*;

The same numbers representing the same element will be used throughout the several figures, and circuits well known in the prior art are identified by name only without specifying their construction.

Figure 2A:
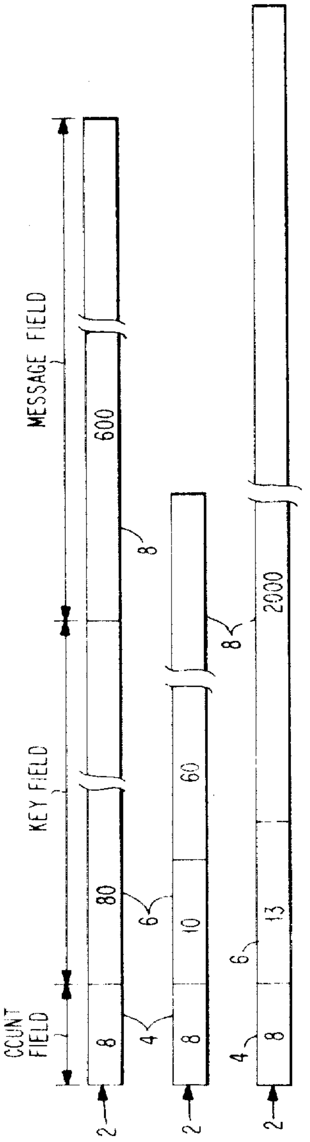

Referring to FIG. 2*a*, there can be seen a schematic representation of a plurality of variable length records 2. Each of the records is divided into three main areas, a count field 4, a key field 6 and a message field 8. An inspection of the records 2 reveals that the count field is always eight bytes in length. A bit is the smallest information unit used in the system and eight bits comprise each data byte. To demonstrate the capacity of the instant invention to process records of variable length, arbitrary lengths have been assigned to the field area of the records shown in FIG. 2*a*. The number of bytes contained in each field is written in the respective field area.

Figure 2C:
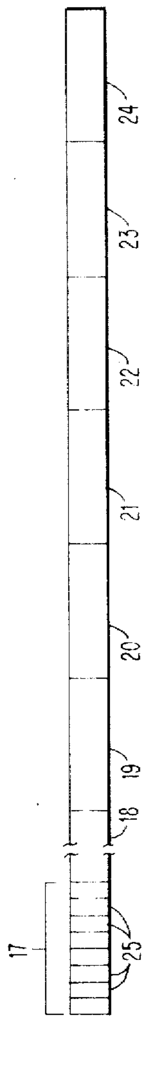
Figure 2B:
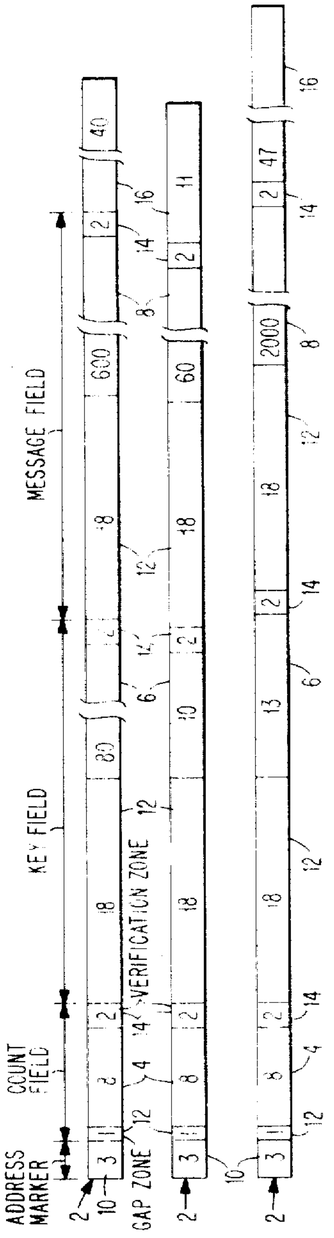

The final appearance of the records 2 is shown in FIG. 2*b*. A description of the record in its recorded configuration will aid in the understanding of the circuitry which is responsible for achieving this configuration. The records 2 are shown written one under the other due to space limitations. However, it is to be understood that the records are to be written sequentially. Additionally, the preceding is not to be a limitation upon the storing of records in parallel fashion, whereby portions of the same record are physically written in side by side configuration, but additional records are written sequentially.

The stored record is divided into the same three main fields 4, 6 and 8 respectively. However, an address marker 10 is positioned at the beginning of each record as a record start alert symbol. Each field area is preceded by a gap zone 12 and followed by a verification zone 14. Additionally, a second gap area 16 is placed at the end of each record. The address marker is three bytes in length and the bit groups in each byte are repetitive as is fully described hereinafter. For the purposes of this description, the gap zone 12 associated with the count field 4 is one byte in length, and the gap zones 12 associated with the key field 6 and the message field 8 are eighteen bytes in length. Other gap lengths could be used and still remain within the scope of the instant invention. The vertification zone 14 is filled with a plurality of bits in prearranged sequence. During the reading of the stored record, a comparison of these bits is made with their original sequence, and a perfect match indicates that the system is operating in an error free condition. For the purposes of this description, the vertification zone is two bytes in length.

An enlarged schematic view of the count field 4 of the record 2 is shown in FIG. 2*c*. The count field comprises eight bytes 17–24 and each byte comprises eight bits 25. The first four bytes 17–20 of the count field are employed to designate the physical location of a selected track on a magnetic disc as is well known in the art. The fifth byte 21 contains an identification number for distinguishing records stored on the same track. The sixth byte 22 carries a binary number designating the number of bytes in the key field 6. The seventh and eighth bytes 23 and 24 carry a binary number designating the number of bytes in the message field 8.

Figure 1A:
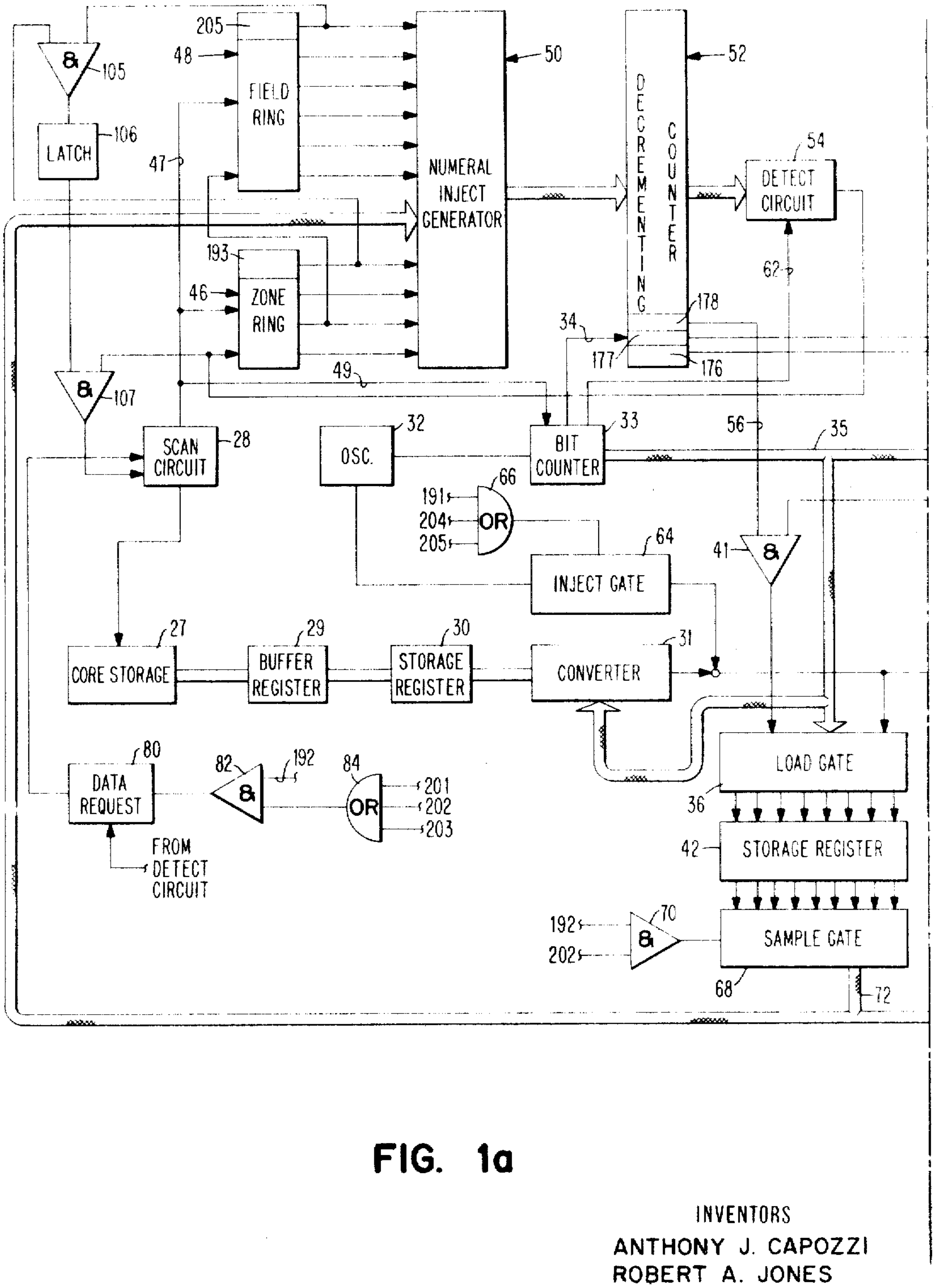
Figure 1B:
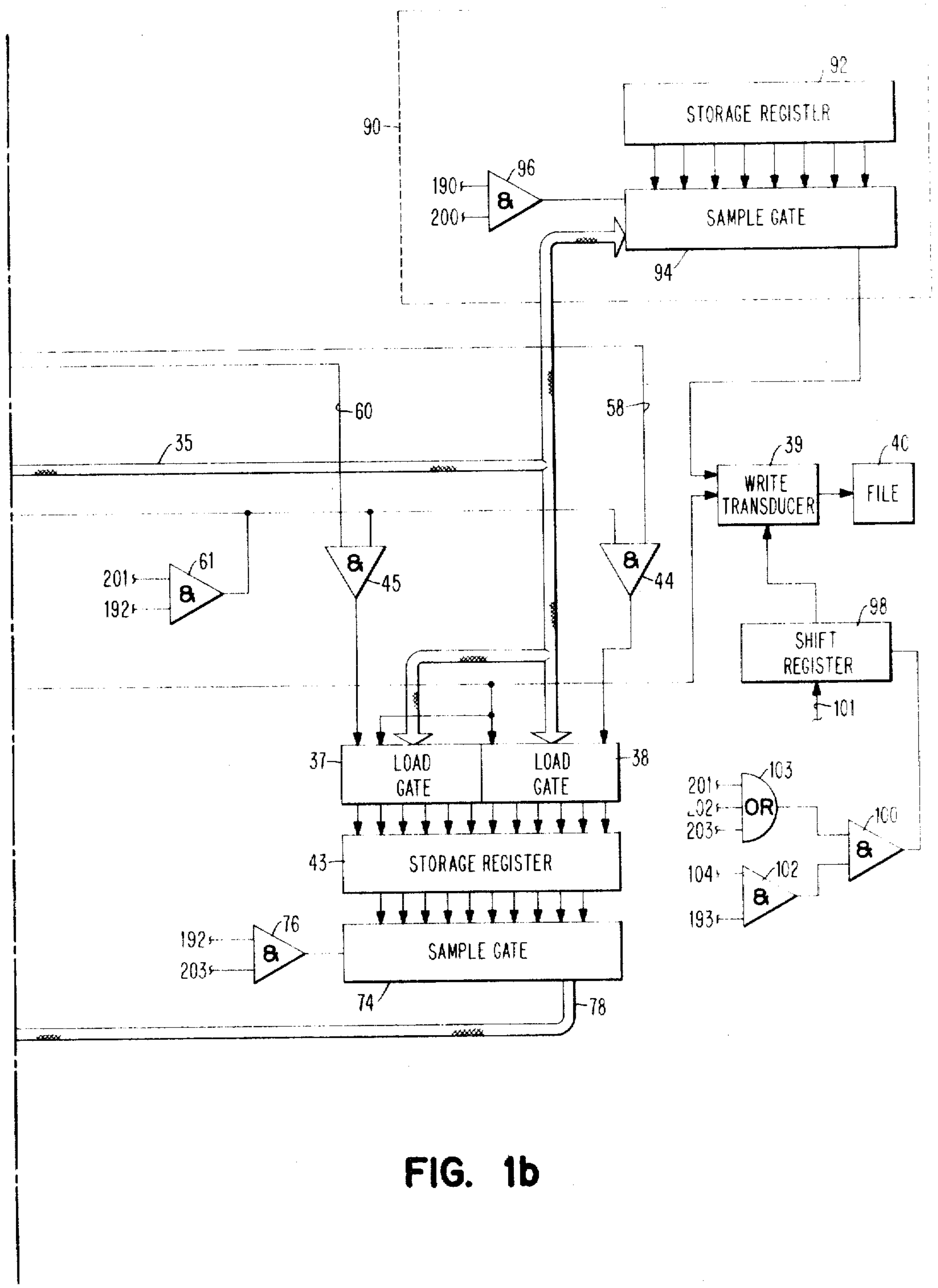

Referring to FIGS. 1*a* and 1*b*, there may be seen a block diagram of a recommended embodiment of the instant invention. The records shown in FIG. 2*a* are held in a core storage area 27 of an associated computer. The operation of the core storage circuit is under the control of a core scan control circuit 28. This control circuit indicates when the information in core storage is to be sampled for transfer to the instant invention. Since the information is written into core storage in computer format, that is, eight parallel bits per byte, the output from the core storage unit 27 is transferred over eight parallel lines to a buffer register 29. This register 29 receives the data from the computer at a rate compatible with the operating rate of the computer. The register 29 transfers each byte to a storage register 30. The function of the register 30 is to hold each byte of data prior to transferring it to a parallel serial converter 31 over eight parallel lines. The parallel serial converter 31 conprises eight AND gates having a single AND gate connected to each input line.

An oscillator circuit 32 is the source of timing signals for the entire system. The oscillator 32 is connected to a bit ring counter 33. This counter is a standard eight position ring counter having an output pulse available on a separate line from each position and an advance pulse is available on a line 34 from the first position of the bit counter 33. The output pulses available on separate lines are grouped together in a single cable 35 and are applied to the converter 31. The positions in the counter 33 are connected to their corresponding AND gates in the converter in order to sample successively the bits in each byte, In this manner, the incoming byte is changed to a serially arranged group of bits 25, as shown in FIG. 2*c*. The output from the converter 31 is applied to a plurality of load gate circuits 36, 37 and 38 respectively and to a write transducer 39 for writing into a file 40.

Each of the load gate circuits 36, 37 and 38 comprise eight individual AND gates. The output from the converter 31 is applied in parallel to each of the individual AND gates in the load gate circuit 36. Obviously, care is taken in maintaining the proper sequence in transferring the signals from the converter 31 to the gate 36 and throughout the remaining circuitry. Each of the individual AND gates in the load gate circuit 36 has an enabling signal applied thereto by an additional AND gate 41 and by the corresponding output signal from one position of the bit counter 33. Therefore, the group of bits which comprise a key byte are loaded into a key length storage register 42 by means of the load gate 36 and the enabling signals applied thereto.

A data byte is transferred from the parallel serial converter 31 to a message length storage register 43 in the same manner as a byte is loaded into the register 42. However, the loading of the register 43 requires a pair of load gates 37 and 38 respectively, since the designation of the message length is contained in two bytes. In order to load the first byte into the register 43, enabling signals are applied to the load gate 38 by means of an AND gate 44 and the corresponding output pulses from the bit counter 33. The second byte is loaded into the register 43 by means of the combined enabling action of an AND gate 45 and the corresponding enabling signals from the bit counter 33.

The core scan control circuit 28 applies a reset signal to a zone cycle control ring 46 and to a field cycle control ring 48 by means of a line 47 and applies a start signal to the bit counter 33 by means of a line 49. The control rings 46 and 48 are standard in construction and comprise a plurality of interconnected stages whereby a plurality of input advance pulses successively energize adjacent stages in the control ring. Although both control rings being in their zero position and advance simultaneously to their one position, thereafter, the zone ring 46 advances in order to its last position and then is automatically reset to position one. Simultaneous with the resetting of zone ring 46 to position one, field ring 48 advances one position. Therefore, the zone ring 46 repeatedly advances through all of its positions and each time it returns to position one, it generates a signal which advances field ring 48 one position. Each separate position of the zone ring 46 is associated with a zone subdivision of the record to be stored on the file and each of the positions associated with field ring 48 indicates a major field area of the record to be stored in the file. As previously mentioned the record comprises three major areas, however, for the purposes of this description, the gap field 16 shown in FIG. 2*b*, is a variable gap type requiring an additional two major areas for the record format. If a fixed gap area 16 had been selected, only one additional position for the cycle control ring 48 would have been necessary.

The combined outputs from the cycle control rings 46 and 48 are employed to gate and to control the operation of the remaining portion of the instant invention. For purposes of clarity, the connections of the various stages of the cycle control rings with the remaining circuitry will not be shown in FIGS. 1*a* and 1*b*, however, these connections will be identified by labeling the inputs to the relevant circuits by the stage number of the ring generating the signal.

Figure 5:
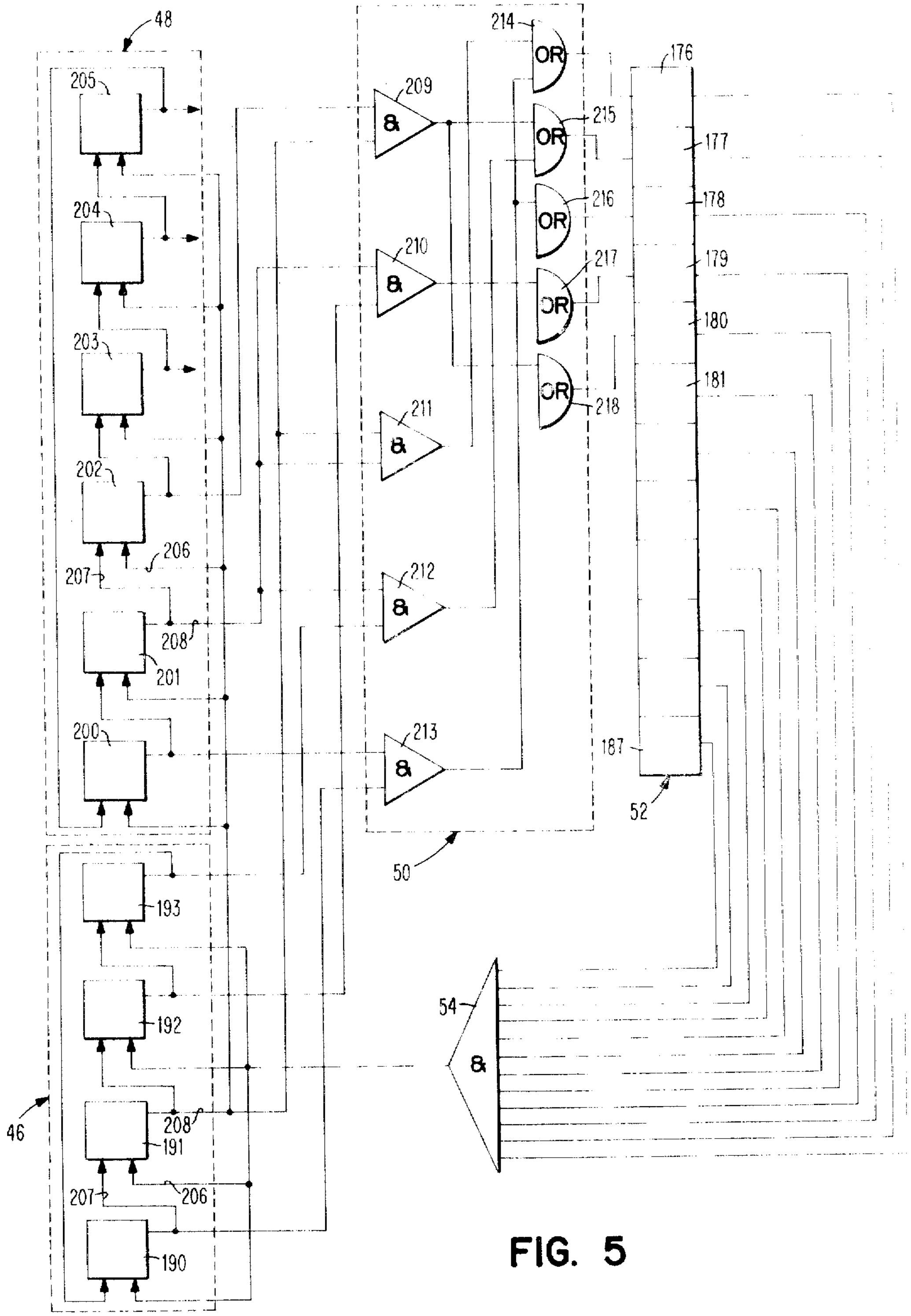
FIG. 5 is a more detailed block diagram of the cycle control circuits employed in the instant invention.

Referring to FIG. 5, there can be seen a more detailed block diagram of the cycle control rings 46 and 48 and a portion of a numeral inject generator 50 employed in the instant invention. Additionally, a decrementing counter 52 is connected to the generator 50, and a detect circuit 54 is connected to the counter 52. A complete description of the cycle control rings is given by A. J. Capozzi in his U.S. patent application entitled "Record Format Control Circuit," Serial No. 354,563, filed March 25, 1964. However, the following description shows how the rings 46 and 48 are employed in the instant invention. The control ring 46 comprises a plurality of stages 190 through 193, and the control ring 48 comprises a plurality of stages 200 through 205. The counter 52 comprises a plurality of stages 176 through 183. Each of the stages in both rings 46 and 48 is connected to a reset line, not shown, for the application of a reset pulse to each stage. The reset pulse causes stages 190 and 200 to be in the ON condition and the remaining stages in both rings 46 and 48 to be in the OFF condition. Additionally, each of the stages in both of the rings have an advance input line 206, an enabling input line 207 and an output line 208.

In the cycle control ring 46, the advance input line of each stage is connected in common to the output of the detect circuit 54, and the advance input line of each stage of the ring 48 is connected in common with the output line of stage 191 of ring 46. The enabling input lines of the stages of rings 46 and 48 are connected to the output lines of the preceding stage in the same ring. The output line 208 of the last stage in each ring is connected to the enabling input line 207 of the first stage in each ring. In operation, an advance signal applied to each of the rings turns off the stage that is on and turns on the next successive stage.

The output line 208 of each stage in both of the rings 46 and 48 is connected to the numeral inject generator 50 which comprises a plurality of AND gates 209 through 213 and a plurality of OR gates 214 through 218. All the AND gates and OR gates employed by the numeral inject generator 50 are not shown in FIG. 5 for purposes of clarity. However, the remaining gates can be added, in view of the remaining description of the instant invention, by one skilled in the art.

The AND gate 213 has two input signals, one of which is the enabling output signal from stage 200 of the control ring 48, and the other of which is the enabling output signal from stage 190 of the control ring 46. The output signal from the AND gate 213 is applied to the OR gates 214 and 216. The OR gate 214 is connected to stage 176 of the decrementing counter 52, and the OR gate 216 is connected to stage 178 of the counter 52.

The AND gate 211 has two input signals, one of which is an enabling output signal from stage 201 of the ring 48 and the other which is an enabling output signal from stage 191 of the ring 46. The output signal from the AND gate 211 is applied as an input signal of the OR gate 214.

The AND gate 210 has two input signals, one of which is an enabling output signal from stage 201 of the ring 48, and the other of which is an enabling output signal from stage 192 of the ring 46. The output signal from the AND gate 210 is applied to stage 179 of the decrementing counter 52 by the OR gate 217.

The AND gate 212 has two input signals, one of which is an enabling output signal from stage 201 of the ring 48, and the other of which is an enabling output signal from stage 193 of the ring 46. The output signal from the AND gate 212 is applied to stage 177 of the counter 52 by the OR gate 215.

The AND gate 209 has two input signals, one of which is an enabling output signal from stage 202 of the ring 48, and the other of which is an enabling output signal from stage 191 of the ring 46. The output signal from the AND gate 209 is connected to the OR gate 215 and to stage 180 of the counter 52 by the OR gate 218.

Referring back to FIGS. 1*a* and 1*b*, the stages of the rings 46 and 48 are connected to the AND gates of the numeral inject generator 50. The AND gates are connected to the stages of the counter 52 and are employed to set a binary number into the counter. Thereafter, drive pulses are applied to the counter to decrement it to its zero condition. Any selected number may be set up in the decrementing counter 52 by means of connections with the AND gates in the numeral inject generator 50.

Each stage in the decrementing counter is connected to the detect circuit 54. It is the function of the detect circuit 54 to indicate when the decrementing counter 52 has been counted to its zero condition and to generate a single positive pulse for application to the input of the control ring 46 for advancing this ring one stage. A zero condition is defined as the turning OFF of the last position of the eight stage bit ring counter 33 while the counter 52 is in the binary zero position. Various stages of the decrementing counter 52 have special functions. Stage 178 is connected as an enabling signal to AND gate 41 by means of a line 56. Stage 177 is connected as an enabling signal to the AND gate 44 by means of a line 58. Stage 176 is connected as an enabling signal to the AND gate 45 by means of a line 60. The AND gates 41, 45 and 46 have an additional enabling signal applied thereto from an AND gate 61. The AND gate 61 has two input signals applied thereto, one of which is an enabling signal from stage 201 of the ring 48 and the other of which is an enabling signal from stage 192 of the ring 46.

The bit counter 33 furnishes a series of driving or advance pulses to the decrementing counter 52 by means of the line 34. The output from the oscillator circuit 32 is applied to a gap inject gate circuit 64, which circuit is enabled by means of an OR gate 66. The input signals to the OR gate 66 are applied thereto from stage 191 of the zone control ring 46 and from stages 204 and 205 of the field control ring 48. During gap periods 12, as shown in FIG. 2*b*, timing pulses from the oscillator 32 are applied to the write transducer 39 by the inject gate 64.

During the variable portions of the record format, the information stored in both the key register 42 and the message register 43 is transferred to the numeral inject generator 50 in order to set binary numbers in the decrementing counter 52. The output lines from the key length storage register 42 are applied to a sample gate circuit 68, which comprises an individual AND gate for each position in the register 42. Each of the AND gates in the sample gate circuit 68 is enabled by an AND gate 70 having input signals applied thereto from stage 192 of the ring 46 and stage 202 of the ring 48. The contents of the key storage register 42 are applied to the numeral inject generator 50 by means of a cable 72. Similarly each position of the message length storage register 43 is connected to an individual AND gate in a sample gate circuit 74. Each of the individual AND gates in the gate circuit 74 has a second input enabling signal from an AND gate 76. The AND gate 76 has two input signals applied thereto, the first of which is an enabling signal from stage 192 of the cycle control ring 46, and the second of which is an enabling signal from stage 203 of the cycle control ring 48. The AND gates in the sample gate circuit 74 are connected to the numeral inject generator 50 by a cable 78.

A data request circuit 80 operates to apply an enabling signal to the core scan control circuit 28 when the file control system is ready to accept data from core storage 27. The data request circuit 80 receives its enabling signal from an AND gate 82. The AND gate 82 has two input signals, one of which is an enabling signal from stage 192 of the zone ring 46 and the other of which is an enabling signal from an OR gate 84. The OR gate 84 has three enabling input signals from stages 201, 202 and 203 of the field ring 48. The data request circuit 80 receives its disabling signal from the detect circuit 54.

The address marker position 10 of the record format, as seen in FIG. 2*b* is filled by means of a marker generator circuit 90. The marker circuit 90 includes a resettable flip-flop storage circuit 92 which is standard in construction. The storage circuit comprises eight flip-flop storage positions and each flip-flop is designed to assume one stable state. It is not necessary to describe the exact stable state assumed by each flip-flop, only that a definite set pattern is chosen. Each flip-flop position in the storage circuit 92 is connected to an address sample gate 94. The gate 94 comprises a plurality of individual AND gates. Each flip-flop position in the storage circuit 92 is connected to a separate individual AND gate. Additionally, each individual AND gate is connected to a corresponding position in the bit counter 33 and to an AND gate 96. The AND gate 96 supplies an enabling signal to each gate in the address sample gate circuit 94. The AND gate 96 has two enabling input signals, one of which is from stage 190 of the zone cycle control ring 46, and the other of which is from stage 200 of the field cycle control ring 48. The output terminals of the individual AND gates in the address sample gate 94 are connected in common to the write transducer 39.

The signals in the verification zone 14 of the record 2, shown in FIG. 2*b*, are generated in a cyclic check shift register 98. This shift register comprises sixteen flip-flop stages which are interconnected and constructed in a well-known manner. The register 98 has a standard reset condition. Upon the receipt of a series of shaft pulses from an AND gate 100, the information in the register 98 is shifted in the manner well known in the art and is applied to the write transducer 39. A reset signal is applied to the register 98 from the detect zero circuit 54 by a line 101. Upon the receipt of this reset signal, the register 98 is reset to its standard condition.

The AND gate 100 has two enabling input signals, one of which is from an AND gate 102, and the other is from an OR gate 103. The AND gate 102 has two input signals, one of which is an enabling signal from stage 193 of the zone cycle control ring 46, and the other is connected to the output line 35 of the bit counter 33 by a line 104. The OR gate 103 has three enabling input signals from stages 201, 202 and 203 of the field cycle control ring 48.

An AND gate 105 has two input signals applied thereto, one of which is an enabling signal from stage 205 of the field ring 48, and the other of which is an enabling signal from stage 193 of the zone ring 46. The output signal from the gate 105 enables a latch 106. The latch applies its output signal to an AND gate 107. The AND gate 107 has a second enabling signal applied thereto from the detect circuit 54. This second enabling signal is the advance signal generated in the circuit 54. The output signal from the AND gate 107 signals the scan circuit that the record is completely written into the file, and that the writing of a second record can begin.

Figure 4:
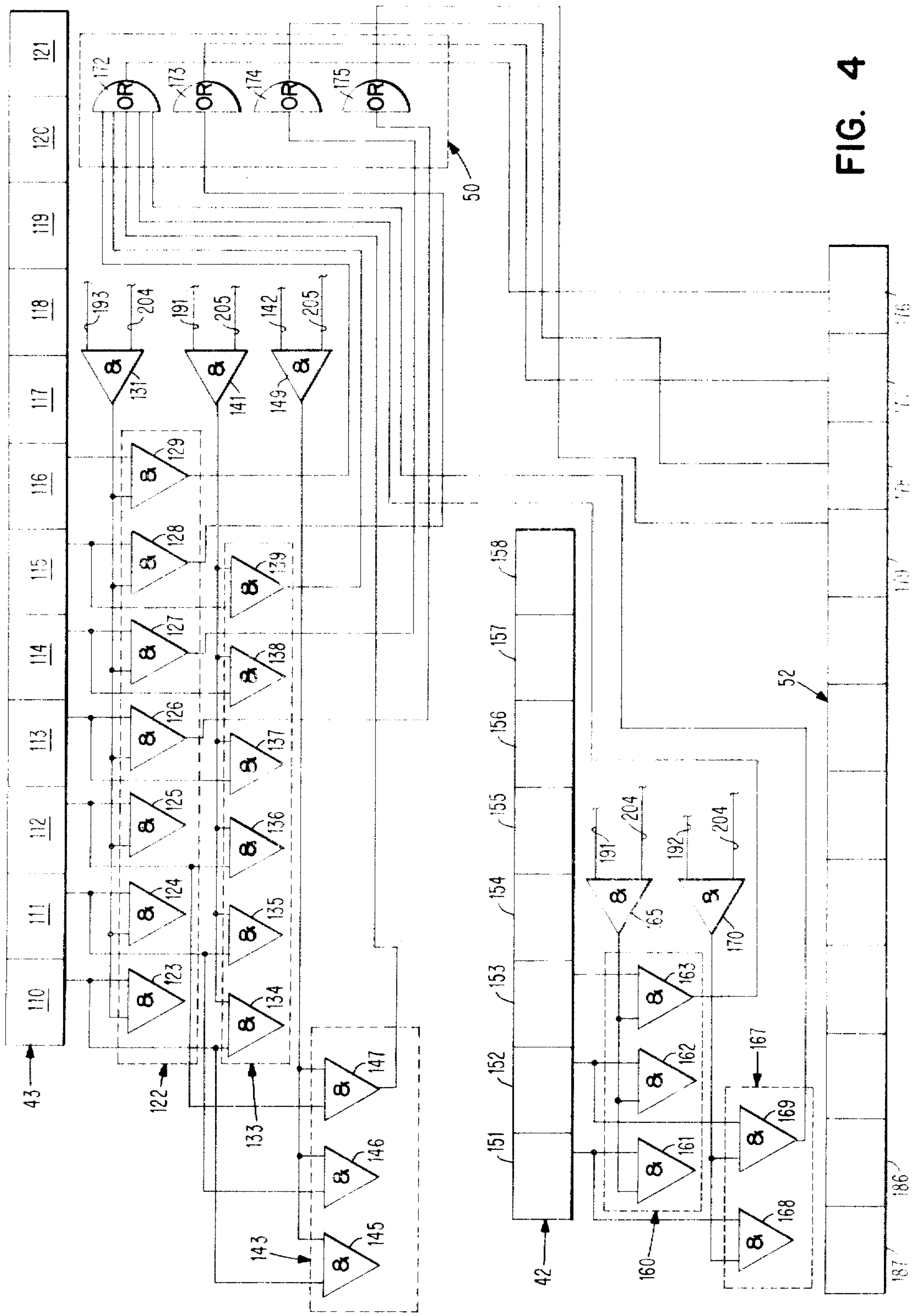
FIG. 4 is a more detailed block diagram of the variable gap setting circuit employed in the instant invention.

FIG. 4 shows the circuitry employed to add the variable gap 16 to the record. The message length storage register 43 employs a plurality of individual stages 110 through 121. A shift gate 122 comprises a plurality of AND gates 123 through 129. The output of the stages 110 through 116 is connected to the AND gates 123 through 129 respectively. The AND gates 123 through 129 have a second input signal from an AND gate 131. The AND gate 131 has two input signals, one of which is the enabling signal from stage 193 of the zone ring 46, and the other of which is the enabling signal from stage 204 of the field ring 48.

A second shift gate 133 comprises a plurality of AND gates 134 through 139, which receive a first input signal from the stages 110 through 115 respectively and receive a second input signal from an AND gate 141. The AND gate 141 has two input signals, one of which is the enabling signal from stage 191 of the zone cycle control ring 46, and the other of which is the enabling signal from stage 205 of the field cycle control ring 48.

A third shift gate 143 comprises a plurality of AND gates 145 through 147 which receive a first input signal from stages 110 through 112 respectively and receive a second input signal from an AND gate 149. The AND gate 149 has two input signals, one of which is the enabling signal from stage 192 of the zone ring 46, and the other of which is the enabling signal from stage 205 of the field ring 48.

The key length storage register 42 comprises a plurality of stages 151 through 158. A shift gate 160 employs a plurality of AND gates 161 through 163, which last mentioned gates receive a first input signal from stages 151 through 153 respectively and receives a second input signal from an AND gate 165. The AND gate 165 has two input signals, one of which is the enabling signal from stage 191 of the zone ring 46, and the other of which is the enabling signal from stage 204 of the field ring 48.

A shift gate 167 comprises a pair of AND gates 168 and 169, which gates receive a first input signal from the stages 151 and 152 respectively and receive a second input signal from an AND gate 170. The AND gate 170 has two input signals, one of which is the enabling signal from stage 192 of the zone ring 46, and the other of which is the enabling signal from stage 204 of the field ring 48.

The output signals from the shift gates 122, 133, 143, 160 and 167 are applied to the numeral inject generator 50. For purposes of clarity, all the connecting lines between the shift gates and the numeral inject generator have not been shown. Additionally, all the stages of the numeral inject generator have not been shown. However, for the purpose of giving a complete description of the circuitry required to add a variable gap length 16 to a record 2, it is sufficient that the generator 50 comprises seven AND gates, of which gates 172 through 175 are shown. The number of gates in the generator 50 equals the largest number to be shifted into the generator and equals the number of gates in the shift gate 122. The AND gate 172 has a signal applied thereto from each of the AND gates 129, 139, 147, 163 and 169 respectively. The AND gate 173 has a signal applied thereto from each of the AND gates 128, 138, 146, 162 and 168 respectively. The AND gate 174 has a signal applied thereto from each of the AND gates 127, 137, 145 and 161 respectively. The AND gate 175 has a signal applied thereto from each of the AND gates 126 and 136 respectively. The remaining AND gates in the generator 50 are connected to the AND gates in the shift gates 132 and 133 in a similar manner. The AND gate 172 is connected to stage 176 of the decrementing counter 50 and the remaining AND gates in the generator 50, associated with the variable gap setting circuitry of the instant invention, are connected to adjacent positions in the decrementing counter 50.

Figure 6:
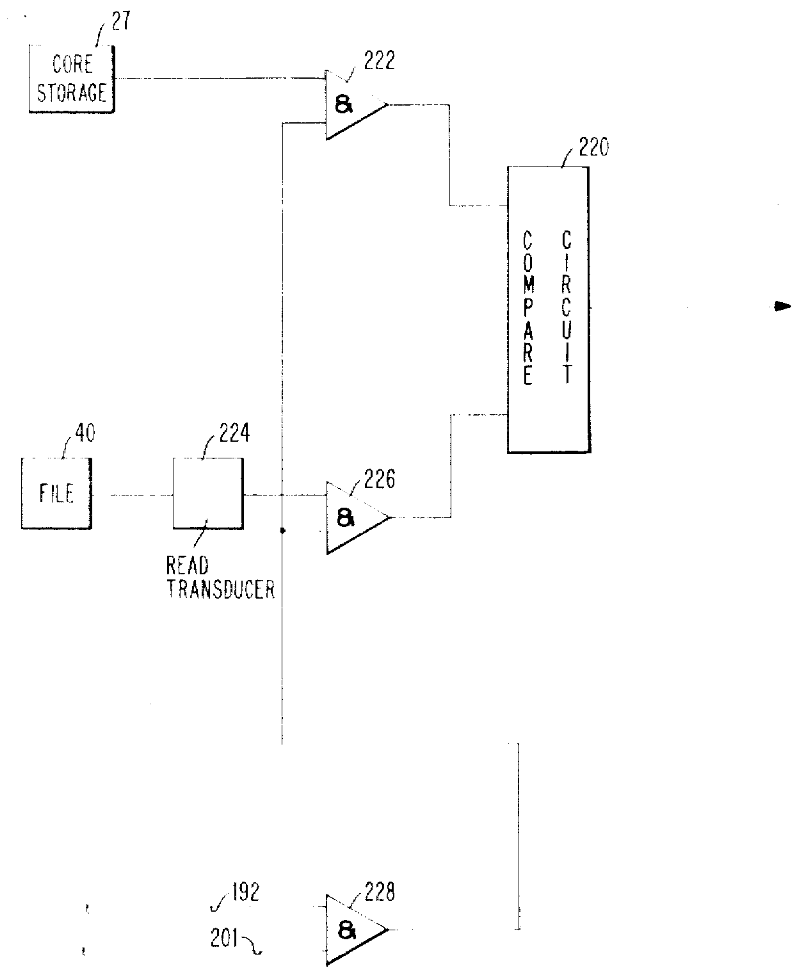
FIG. 6 is a block diagram of the circuit employed to locate a single record stored on a track.

FIG. 6 shows a schematic view of the circuitry required to locate a single record written on one track of a storage disc or a storage strip. The core storage circuit 27 contains the count field of the record that is being sought. The count field from the core storage circuit 27 is applied to a compare circuit 220 by an AND gate 222. The file 40 contains a plurality of records stored on a single track of a magnetic disc or a magnetic strip. The count field from the file 40 is applied to the compare circuit 220 by a read transducer 224 and an AND gate 226. The AND gates 222 and 226 have a second enabling input signal applied thereto from an AND gate 228. The AND gate 228 has two input signals, one of which is an enabling signal from stage 192 of the ring 46, and the second of which is an enabling signal from position 201 of the ring 48.

Figure 3A:
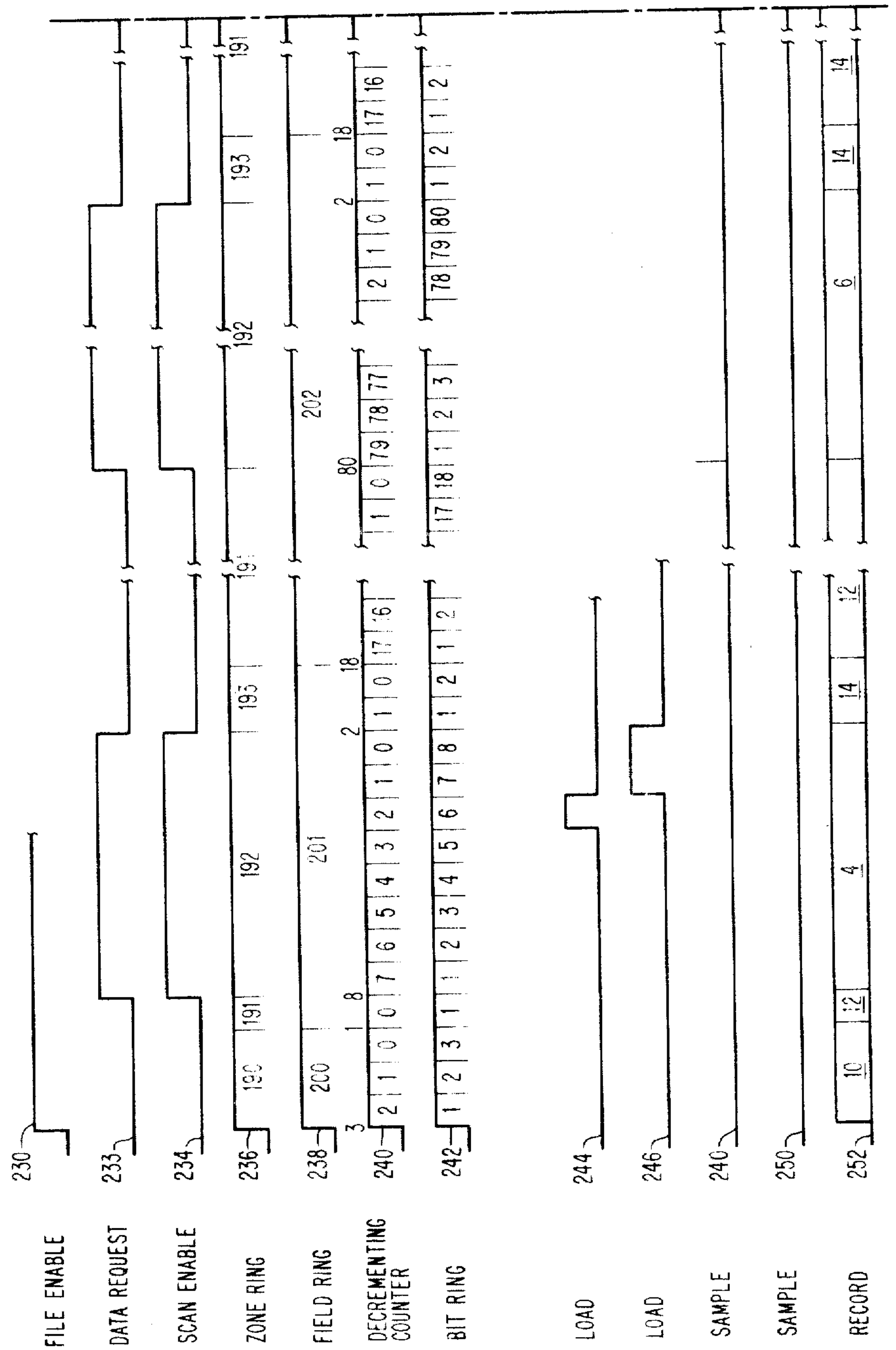
Figure 3B:
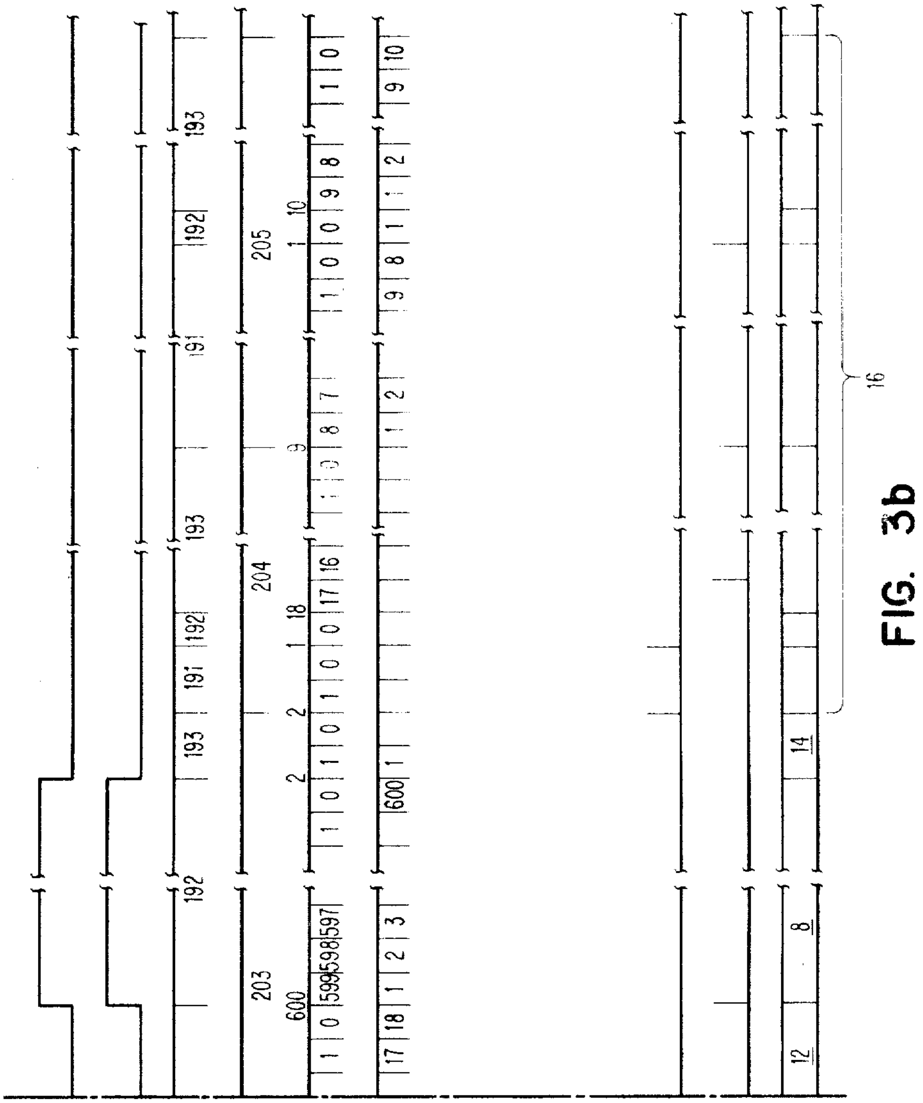

The operation of the circuitry shown in FIGS. 1*a*, 1*b*, 4 and 5 can best be understood by reference to the plurality of timing figures shown in FIGS. 3*a* and 3*b*. A waveform 230 represents a file enable signal applied to the bit counter 33 by means of the line 49 and to the rings 46 and 48 by the line 47. This enabling signal originates in the scan control circuit 28 and is present during the entire writing operation wherein data is transferred from the core storage circuit 27 to the file 40. This signal resets the rings 46 and 48 and the counter 33 to their starting positions. Waveform 233 is a data request signal which originates in the data request circuit 80 and is applied to the scan circuit 28 indicating that the file is ready to receive a portion of the record. There are three positive excursions of the data request waveform 233. It is during these positive excursions that the three field areas of the record are transferred to the file unit 40. A waveform 234 is a scan enable waveform which corresponds to the data request waveform 233 and which originates in the scan circuit 28. When the file system generates a data request signal, the scan enabling waveform 234 is applied to the core storage unit 28 and data is read from core storage to the file 40. Waveforms 236 and 238 represent the combined outputs from the stages of the cycle control rings 46 and 48 respectively.

Upon the reception of a file enable signal 230, stages 190 and 200 of the cycle control rings 46 and 48 respectively are turned ON and the remaining stages in both rings are turned OFF. The output signals from stages 190 and 200 are connected to the numeral inject generator 50 as shown in FIG. 5. The generator 50 energizes stages 176 and 178 of the decrementing counter 52, thereby injecting a binary 3 into the counter 52. Simultaneously, the output signals from stage 190 of the ring 46 and stage 200 of the ring 48 are applied to the AND gate 96 which operates as an enabling signal to the sample gate 94.

Waveform 240 indicates the decrementing of the counter 52 in response to the advance pulses applied thereto by line 34. For example, during the insertion of an address marker into the file, a binary three is injected into the counter 52. The counter immediately is set to the binary two position by the turning ON of the first position of the bit counter 33. Thereafter, in conjunction with the waveform 242, the decrementing of the counter 52 is shown in waveform 240 each time the bit counter 33 starts a new cycle as shown in waveform 242.

By referring to waveforms 236, 238, 240 it can be seen that the output signals from stages 190 and 200 of the cycle control rings 46 and 48 respectively are available while the decrementing counter counts through its three lower stages. During this combination of output signals from the rings 46 and 48, the storage register 92 is cycled three times and writes the address marker 10 into the file 40. The detect circuit 54 indicates the termination of three complete byte positions and applies an advance signal to the zone cycle control ring 46. With the application of this advance signal, stage 191 turns ON and generates an output pulse on its output line 208 for application as an additional advance signal for the filed cycle control ring 48.

The output signals from stages 191 and 201 are combined in the AND gate 211, as shown in FIG. 5, of the numeral inject generator 50 and are employed to set the decrementing counter 52 into its zero binary position. During these relative positions of cycle control rings, the gap zone 12 associated with the count field 4 of the record is written into the file. This is accomplished by employing the output signal from stage 191 as an input signal to the OR gate 66. The output from the gate 66 enables the gap inject gate 64 and permits timing pulses to be written into the file 40 by the write transducer 39. Simultaneously, the counter 52 is being decremented by the train of pulses applied thereto from the bit counter 33. Upon the detection of a zero condition, the detect zero circuit 54 again applies an advance pulse to the zone cycle control ring 46 turning stage 192 ON.

The output signals from stages 192 and 201 are applied to the data request circuit 80 by the AND gate 82 and the OR gate 84 respectively. The circuit 80 generates to a data request signal and applies it to the scan circuit 28 which in turn scans out the count field 4 of the record in core storage 27.

For the purpose of this description, the count field 4 is eight bytes long. The first four bytes concern the physical location of the particular magnetic track upon which the record is to be written and need not be further explained for the purposes of this disclosure. Reference can be made to FIG. 2*c* wherein an exploded view of the count field is shown. The first byte position 17 has been further enlarged out of proportion, with respect to the rest of the figure, to show the eight-bit positions contained within one byte position. The fifth byte position 21 contains the record number of the particular record being written in the file. For example, if more than one record is to be written on one track on a disc, each adjacent record will have a record number assigned to it in an ascending order. The sixth byte position 22 contains a binary number designating the number of bytes contained in the key field 6 of the record 2 in core storage. It is necessary that the binary number in position 22 be transferred to the key length storage register 42.

Byte positions 23 and 24 of the count field contain a binary number designating the number of bytes contained in the message field 8 of the record 2 in core storage. It is necessary that this binary number in positions 23 and 24 be transferred to the message length storage register 43.

The output signals from stages 192 and 201 of the cycle control rings 46 and 48 are respectively applied to the numeral inject generator 50 which in turn sets the binary number 8 into the decrementing counter 52. The output enabling signals of stage 192 from the zone cycle control ring 46 and of stage 201 from the field cycle control ring 48 are applied to the AND gate 61. The output from the AND gate 61 is applied as an enabling signal to the AND gates 41, 44 and 45. The AND gates 41, 44 and 45 have additional enabling inputs from the stages 178, 177 and 176 respectively of the decrementing counter 52. The enabling signal from stage 178 of the counter 52, when applied to the AND gate 41, indicates that the sixth byte position of the count field is being transferred from core storage to the file unit. Therefore, at this time the load gate 36 is enabled by the combined operation of the output signal from the AND gate 41 and the output pulses from the bit counter 33. The loading period of the storage register 42 is shown in waveform 244 of FIGS. 3*a* and 3*b*. Additionally, waveform 252 represents the record as it is entered into the file 40.

The output signal from stage 177 of the counter 52 is applied to the AND gate 44 and is employed as the gating signal to transfer the seventh byte position 23 of the count field 4 to the data length register 42 by the load gate 38. In a similar manner, the output signal from stage 176 of the counter 52 is employed to transfer the eighth byte position 24 of the count field 4 to the data length register 43 by the load gate 37. The loading period of the storage register 43 is shown in waveform 246 of FIGS. 3a and 3b.

The circuit 54 applies an advance pulse to the zone cycle control ring 46 turning stage 193 ON. By referring to FIGS. 3a and 3b, it can be seen that the turning ON of stage 193 of the zone cycle control ring 46 and the remaining ON of the stage 201 of the field cycle control 48 indicate the requirement for the verification zone 14 associated with the count field 4 of the record 2. In order to instrument this requirement, the shift register 98 transfers its contents into the file 40 through the write transducer 39.

The output signal from stage 201 of the field cycle control ring 48 is applied to the OR gate 103, and the output signal from stage 193 of the zone cycle control ring 46 is applied to the AND circuit 102. The AND gate 102 has an additional train of input signals from the bit counter 33. The output signals from the OR gate 103 and the AND gate 102 are applied to the AND gate 100. The output from the AND gate 100 consists of a series of pulses occurring at the basic timing frequency of the system as furnished by the bit counter 33. Simultaneously, the output pulses from stages 193 and 201 are applied to the numeral inject generator 50 which sets the counter 52 to its binary two position. Therefore, as the counter decrements, the shift register 98 transfers its contents into the file 40. Additionally, the detection of a zero condition and the subsequent application of an advance pulse to the zero ring 46 stops the operation of the shift register 98 by the removal of the enabling signal to the AND gate 102 from stage 193. Stage 191 of the zone ring 46 is turned ON thereby applying an advance signal to the field ring 48 and turning ON stage 202 of that ring.

Referring to FIGS. 3a and 3b, it can be seen that the turning ON of stages 191 of the zone cycle control ring 46 and stage 202 of the field cycle control ring 48 indicates the requirement of a gap zone 12. Accordingly, the outputs from these two stages are combined in the numeral inject generator 50 and are employed to set up a binary number in the decrementing counter 52 corresponding to the desired length of the gap to be written. For the purposes of this description, the binary number eighteen is set up in the counter 52. Simultaneously, the output from stage 191 of the zone cycle control ring 46 is applied to the OR gate 66 which again is employed to enable the gap inject gate 64, whereby timing pulses are written into the file 40 by means of the write transducer 39. When the detect circuit indicates a zero condition and applies an advance signal to the zone cycle control ring 46, stage 192 is turned on.

The output enabling signal from stage 192 of the zone cycle control ring 46 is applied to the AND gate 82, and the output from stage 202 of the field cycle control ring 48 is applied to the OR gate 84. The data request circuit again operates to perform the same function as previously described and enables the core scan control circuit 28 to transfer the key field of the record from the computer core storage 27. The signals from the core storage 27 are written into the file 40 by the write transducer 39. The duration of the data request signal during this period is determined by the number of bytes in the key field. This number is contained in the key storage register 42. Therefore, the content of the storage register is sampled and is transferred to the decrementing counter 52.

This sampling and transferring operation is achieved by applying the output signals from stage 192 of the zone cycle control ring 46 and from stage 202 of the field cycle control ring 48 to the AND gate 70, which gate operates to furnish an enabling signal to the sample gate 68. The output from the sample gate 68 is applied to the numeral inject generator 50 by means of a cable 72. The sampling and transferring operation of the number in the key length storage register 42 to the generator 50 is shown in waveform 248 of FIGS. 3a and 3b. In this manner the binary number contained in the key storage register 42 is applied to the logic circuitry of the numeral inject generator 50 and the identical number is then set up in the decrementing counter 52. The counter 52 decrements towards the zero condition. Upon the detection of the zero condition by the detect circuit 54, an advance signal is applied to the zone cycle control ring 46 turning ON its stage 193. The turning OFF of the stage 192 removes the enabling signal from the AND gate 82 and terminates the data request signal originating in the request circuit 80.

Referring to waveforms 236, 238 and 252, as shown in FIGS. 3a and 3b, it can be seen that an output enabling pulse from stages 193 and 202 of the rings 46 and 48 respectively indicates that a second verification message is written into the file 40. This verification operation is identical with the verification operation explained concerning the verification zone 14 associated with the count field 4. Therefore, it is not thought necessary to explain it again. At the end of the verification zone 14 associated with the key field 6, a third fixed length gap associated with the message field 8 is entered into the file 40. The gap is entered the same way as previously described, that is by means of the OR gate 66 and the gap inject gate 64. For purposes of this description, a fixed gap of eighteen bytes is entered.

At the termination of the gap zone 12 associated with the message field 8, the core scan control circuit 28 is again operated in a manner as previously described in order to transfer information from the core storage 27 to the file 40. The only divergence from the manner previously described lies in the application of the output signal from stage 203 as the enabling signal to the OR gate 84. The output signal from stage 192 of the zone cycle control ring 46 is applied to the AND gate 76 and an output signal from stage 203 of the field cycle control ring 48 is applied to the AND gate 76. The output from the AND gate 76 is applied to the sample gate circuit 74 in order to transfer the contents of the message length storage register 43 to the numeral inject generator 50 by the cable 78. The numeral inject generator operates to set the binary number contained in the message length storage register into the decrementing counter 52. The sampling and transferring of the content of the register 43 to the generator 50 is shown in waveform 250 of FIGS. 3a and 3b. Thereafter, the message in the core storage circuit 27 is transferred to the file as counter 52 is decremented towards the zero condition. The zero condition is detected by the detect circuit 54 and an advance signal is applied to the zone ring 46. The data request signal is terminated in the same manner as previously described.

Referring to waveforms 236, 238 and 252, it can be seen that a third verification message is entered into the file 40. This message is again entered essentially in the same manner as previously described. However, for this verification message, the output signal from stage 203 serves as the enabling signal to the OR gate 103.

The third verification message is terminated by the detect circuit 54 applying an advance pulse to the zone ring 46 and removing the enabling output pulse of stage 193 from the AND gate 102. Stage 191 of the ring 46 is again turned on applying its output signal as an advance signal to ring 48 and turning on stage 204 of the ring 48. At this location in the record as shown in FIGS. 3a and 3b, it is possible to inject a fixed gap 16 for separating adjacent records on a single track of a magnetic disc or strip. This fixed gap 16 is injected onto the record in a manner similar to the previously injected gaps 12. However for the purpose of this description, a variable gap operation will be explained in order to fully demonstrate the capabilities of the present invention.

Referring to FIG. 4, there is shown the circuitry employed to enter a variable gap 16 between adjacent records on the same track. The enabling output signals from stages 191 and 204 of the rings 46 and 48 respectively are applied to the AND gate 165. The AND gate 165 furnishes an enabling signal to the shift gate 160 for shifting the contents of the three highest stages 151, 152 and 153 of the storage register 42 to the three lowest stages 178, 177 and 176 respectively of the counter 52 through the generator 50. By shifting the contents of three highest stages of the key storage register 42 to the three lowest stages of the decrementing counter, a certain percentage of the binary number in the key storage register is set up in decrementing counter. For the purpose of this description, this percentage has been determined to be approximately 3.0 percent of the length of the key field 6. Thereafter, a gap equal to this percentage is inserted into the record in the same manner as described with the gaps 12.

The detect circuit 54 indicates the next zero condition and applies an advance signal to ring 46, turning stage 192 ON. The output signal from stage 192 of the ring 46 is applied to the AND gate 170 in addition to the output signal from stage 204 of the field cycle control ring 48. The output signal from the AND gate 170 enables the AND gates 168 and 169 and shifts the contents of the stages 151 and 152 of the key storage register 42 to stages 177 and 176 respectively of the counter 52. Again a gap is added to the one just previously written and is equal to 1.56 percent of the length of the key field 6. The detect circuit 54 indicates the next zero condition and applies an advance signal to the ring 46 turning stage 193 ON. The output signals from stages 193 and 204 are applied to the AND gate 131. The output from the AND gate 131 is applied to the AND gates 123 through 129 in the shift gate 122. The contents of stages 110 through 116 are shifted to stages 182 through 176 of the counter 52 in the manner similar to the shifting of the information from the key storage register 42 to the decrementing counter 52. Again a number is set up in decrementing counter and the counter begins to decrement. Simultaneously an additional gap is injected into the file 40. This gap is equal to three percent of the length of the message field 8.

Additional variable length gap areas are written into the file corresponding to the enabling signals applied to the AND gates 141 and 149. Finally, a fixed length gap area is added to the gaps previously written. The enabling output signals from stage 193 of the ring 46 and from stage 205 of ring 48 are applied to the generator 50 which sets a fixed number into the counter 50. This final gap is added to the record in the same manner as previously described. For the purpose of this description, the binary number ten is set into the counter 52.

Referring to the waveform 252, there can be seen the values of the variable and fixed portions of the gap 16 which correspond to the length of the key field 6 and message field 8 of the record 2 shown in FIG. 2*a* as being eighty and six hundred bytes in length respectively.

In general, the shifting of a binary number one position, in the manner taught by the instant invention, causes a fifty percent reduction of the number. Additionally, the shifting of two positions causes a twenty-five percent reduction of the number. Each additional shift reduces by half the value of the preceding number. Therfore, a certain percentage of any number can be achieved either by a single shift of the required number of positions or by combining the percentages of more than one shift as is practiced by the instant invention. It has been found that a cap between records of approximately 5 percent is sufficient to permit the circuitry of a data filing system to equalize. The combining of the two shifts of the number from the storage register 42 and the subsequent decrementing of the counter 52 provides a gap which is 4.68 percent of the length of the key field. The combining of the three shifts of the number from the storage register 43 and the subsequent decrementing of the counter 52 provides a gap which is 4.87 percent of the length of the message field. With the addition of the constant gap length in the gap zone 16, a variable gap is entered into the file between successive records which maximizes the storage capacity of the file by avoiding the use of excessive gap lengths.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A data filing system for entering a record format onto a magnetizable surface rotating at a constant rate, comprising
   - a core storage circuit for holding a plurality of variable length records, each including at least two fields,
   - one of said fields including indicia designating the length of the other of said fields,
   - means for injecting a plurality of gaps onto said magnetizable surface,
   - means for transferring each of said fields to said magnetizable surface,
   - control means connected to said gap injecting means and said field transfer means for producing a plurality of enabling signals which alternately enter fields and gaps onto said magnetizable surface,
   - storage means enabled by said control means and connected to said transfer means for storing said length indicia,
   - means responsive to said control means and connected to said storage means for applying said length indicia to said control means, and
   - means responsive to said control means and connected to said storage means for shifting a portion of said length indicia to said control means.

2. A data filing system for entering a record format onto a magnetizable surface rotating at a constant rate, comprising
   - a core storage circuit for holding a plurality of variable length records, each being divided at least into a count field and a message field,
   - said count field including at least indicia designating the length of said message field,
   - means for injecting a plurality of gaps onto said magnetizable surface,
   - means for transferring each of said fields to said magnetizable surface,
   - control means connected to said gap injecting means and said field transfer means for producing a plurality of enabling signals which alternately enter fields and gaps onto said magnetizable surface,
   - storage means enabled by said control means and connected to said transfer means for storing said message length indicia,
   - means responsive to said control means and connected to said storage means for applying said message length indicia to said control means, and
   - means responsive to a plurality of enabling signals from said control means and connected to said storage means for repetitively shifting portions of said message length indicia to said control means.

3. A data filing system for entering a record format onto a magnetizable surface rotating at a constant rate, comprising a core storage circuit for holding a plurality of variable length records, each being divided into a count field, a key field and a message field, said count field including at least indicia designating the length of said key field and said message field, means for injecting a plurality of gaps onto said magnetizable surface, means for transferring each of said fields to said magnetizable surface, control means connected to said gap injecting means and said field transfer means for producing a plurality of enabling signals which alternately enter fields and gaps onto said magnetizable surface, means enabled by said control circuit and connected to said transfer means for storing said key length indicia and said message length indicia, means responsive to said control means and connected to said storage means for applying said key length indicia and said message length indicia to said control means, and means responsive to said control means and connected to said storage means for shifting a portion of said key length indicia and said message length indicia to said control means.

4. A data filing system for entering a record format onto a magnetizable surface rotating at a constant rate, comprising a core storage circuit for holding a plurality of variable length records each being divided into a count field, a key field, and a message field, said count field including at least indicia designating the length of said key field and said message field, means for injecting a plurality of gaps onto said magnetizable surface, means for transferring each of said fields to said magnetizable surface, control means connected to said gap injecting means and said field transfer means for producing a plurality of enabling signals which alternately enter fields and gaps onto said magnetizable surface, a first means enabled by said control means and connected to said transfer means for storing said key length indicia, a second means enabled by said control means and connected to said transfer means for storing said field length indicia, means responsive to said control means and connected to said first storage means for applying said key length indicia to said control means, means responsive to said control means and connected to said second storage means for applying said field length indicia to said control means, and means responsive to said control means and connected to said first storage means for shifting a portion of said key length indicia to said control means, and means responsive to said control means and connected to said second storage means for shifting a portion of said key length indicia to said control means.

5. A data filing system for entering a record format onto a magnetizable surface rotating at a constant rate, comprising a core storage circuit for holding a plurality of variable length records, each being divided into a count field, a key field and a message field, said count field including at least indicia designating the length of said key field and said message field, means for injecting a plurality of gaps onto said magnetizable surface, means for transferring each of said fields to said magnetizable surface, control means connected to said gap injecting means and said field transfer means for producing a plurality of enabling signals which alternately enter fields and gaps onto said magnetizable surface, means enabled by said control circuit and connected to said transfer means for storing said key length indicia and said message length indicia, means responsive to said control means and connected to said storage means for applying said key length indicia and said message length indicia to said control means, and means responsive to a plurality of enabling signals from said control means and connected to said storage means for repetitively shifting portions of said key length indicia and said message length indicia to said control means.

6. In a data filing system as recited in claim 5, said repetitive shifting means comprises, a plurality of shift gates connected to said storage means, and an enabling gate connected to each shift gate.

References Cited by the Examiner

UNITED STATES PATENTS

| | | | |
|---|---|---|---|
| 2,907,002 | 9/1959 | Smith | 340—174 |
| 2,907,010 | 9/1959 | Spielberg | 340—174 |

ROBERT C. BAILEY, *Primary Examiner.*

R. B. ZACHE, *Assistant Examiner.*